(12) United States Patent
Itoh

(10) Patent No.: US 6,413,838 B2
(45) Date of Patent: Jul. 2, 2002

(54) MANUFACTURING METHOD OF DISPLAY DEVICE

(75) Inventor: Nobuyuki Itoh, Noda (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/798,348

(22) Filed: Mar. 2, 2001

(30) Foreign Application Priority Data

Mar. 3, 2000 (JP) ........................................ 2000-059675

(51) Int. Cl.[7] ............................................. H01L 21/301
(52) U.S. Cl. ........................ 438/462; 438/66; 438/125; 438/149
(58) Field of Search ................................. 438/359, 489, 438/149, 283, 205, 66, 125, 6, 83, 208, 455–459, 460–465, 689

(56) References Cited

U.S. PATENT DOCUMENTS 5,827,757 A * 10/1998 Robinson et al. ............. 438/66
5,923,961 A * 7/1999 Shibuya et al. ............. 438/149
5,932,484 A * 8/1999 Iwanaga et al. ............. 438/125

FOREIGN PATENT DOCUMENTS

| JP | 5-249496 | 9/1993 |
| JP | 5-249497 | 9/1993 |
| JP | 7-22706 | 1/1995 |
| JP | 7-86691 | 3/1995 |

* cited by examiner

*Primary Examiner*—David Nelms
*Assistant Examiner*—Long Tran
(74) *Attorney, Agent, or Firm*—Dike, Bronstein, et al.; David G. Conlin

(57) ABSTRACT

A display apparatus includes at least one substrate; a plurality of signal lines provided on the at least one substrate; and a matrix arrangement of a plurality of active devices fixed on the at least one substrate, wherein each of the plurality of active devices is formed on a semi-insulative crystal.

3 Claims, 2 Drawing Sheets

MANUFACTURING METHOD OF DISPLAY DEVICE

BACKGROUND OF THE INVENTION

1. Field of the Invention

The present invention relates to a display apparatus, and more specifically, to a structure and manufacturing method of a so-called active matrix display apparatus.

2. Description of the Related Art

A display apparatus, as an interface between a person and a computer, has been studied with respect to various display modes, so as to satisfy a growing demand in the information technology society for higher response speeds to enable reproduction of moving pictures with high contrast and reality.

Among other conventional display modes, an active matrix mode, where control is provided by placing an active device on each pixel, has been mainly used, and will be an important technique.

An active matrix mode using thin film transistors (hereinafter referred to as "TFTs"), in which Si is used as an impurity semiconductor material, is an especially important technique not only for liquid crystal display devices but also for other display devices such as organic electroluminescence (hereinafter referred to as "EL") devices.

Furthermore, Japanese Laid-open Publication Nos. 7-22706 and 7-86691 describe an emissive display apparatus using a surface emitting laser.

As shown in FIG. 3, an active matrix display apparatus includes a plurality of intersecting signal electrodes 5 and a plurality of switching devices 6 (such as TFTs) provided on a substrate 1.

There is a class of active matrix display modes in which an electric field is applied to a medium (e.g., a liquid crystal or an organic EL light-emission layer) through an electrode coupled to each switching device 6. In another class of active matrix display modes, the switching devices 6 themselves emit light (e.g., surface emitting laser display devices). A surface emitting laser device is produced on a compound crystal substrate, e.g., GaAs.

The above-described transistor or surface emitting laser composed essentially of impurity semiconductor materials (e.g., Si or GaAs) is usually produced from a single crystal. However, TFTs used for liquid crystal display devices are currently produced from amorphous Si for the following reasons. Firstly, in order to produce a large-size display apparatus, it is difficult to produce a single crystal adapted to such a large size. Therefore, a large-size Si substrate is prepared by first subjecting Si to plasma-disintegration and then depositing the resultant amorphous Si on the substrate. Secondly, if the substrate is required to be transmissive, as in the case of liquid crystal displays, it is necessary to provide Si on a glass substrate.

Since the amorphous state is occupied by countless grain boundaries which would not appear in a single crystal state, movement of carriers is inhibited, thereby considerably reducing carrier mobility. Thus, amorphous Si, which is currently used for liquid crystal display devices, cannot exploit the ability of a single crystal (Si) impurity semiconductor material, which have initially found application in LSIs. Moreover, polycrystal Si, which includes fewer grain boundaries and has higher carrier mobility than amorphous Si, began to be used recently, but its performance is considerably inferior to that of single crystal Si.

For a small-size substrate, it is within current practice to produce an active matrix array of impurity semiconductor devices directly on a single crystal, such as Si or GaAs (see Japanese Laid-open Publication Nos. 7-22706 and 7-86691). However, as described in Japanese Laid-open Publication No. 7-22706, such a small-sized substrate can only be used, for example, as a part of a projector-type expansion display apparatus. It is difficult to use the techniques described in Japanese Laid-open Publication No. 7-22706 to produce a direct-view type large display apparatus.

Japanese Laid-open Publication No. 5-249496 describes a method for providing a MOS transistor produced from a single crystal Si on a transmissive substrate. However, it is also essentially impossible to use this method to produce a display device, larger than the original single-crystal substrate (wafer), because the size of such a substrate is predetermined. While more and more display devices having a size exceeding 20 inches are being marketed, the maximum size of Si wafers still remains unchanged at a diameter of 8 inches.

Producing an active matrix array of impurity semiconductors, such as single-crystal Si or GaAs compounds, which is independent from substrate size can provide a display apparatus having much higher performance and reliability than is currently possible.

However, due to the above-described problems concerning the size of single-crystal substrates, such as Si or GaAs, the current techniques cannot produce a large direct-view type display apparatus. The current maximum wafer diameter is 8 inches for single-crystal wafers of Si and 5 inches for single-crystal compound wafers such as GaAs. Thus, it is essentially impossible with the current techniques to produce a large display device having a size of 30 inches or more, e.g., HDTV devices.

SUMMARY OF THE INVENTION

According to one aspect of the invention, there is provided a display apparatus including at least one substrate; a plurality of signal lines provided on the at least one substrate; and a matrix arrangement of a plurality of active devices fixed on the at least one substrate, wherein each of the plurality of active devices is formed on a semi-insulative crystal.

In one embodiment of the invention, the plurality of active devices are MOS transistors formed from single-crystal Si.

In another embodiment of the invention, the plurality of active devices are surface emitting lasers formed from crystals of a GaAs compound.

According to another aspect of the invention, there is provided a method for manufacturing a display apparatus, including the steps of: producing a plurality of active devices on a semi-insulative crystal; reducing a thickness of the crystal from a lower face thereof to attain a predetermined thickness; isolating the plurality of active devices from one another; forming a plurality of holes in a second substrate adapted to a matrix arrangement in which the plurality of active devices are to be deployed on a display apparatus; placing the plurality of active devices into the plurality of holes; and after the plurality of active devices are placed into the plurality of holes, pressing the second substrate against a first substrate on which a plurality of wires are formed, thereby transferring the plurality of active devices onto the first substrate and connecting each of the plurality of wire to a corresponding one of the plurality of active devices.

In one embodiment of the invention, the plurality of active devices are MOS transistors formed from single-crystal Si.

In another embodiment of the invention, the plurality of active devices are surface emitting lasers formed from crystals of a GaAs compound.

According to the present invention, it is possible to produce an active matrix array of semiconductor materials, such as a single-crystal Si or GaAs compound, regardless of the size of a substrate. Thus, it is possible to produce a TFT active matrix array substrate of high-performance transistors of single-crystal Si and an auto-emission active matrix display apparatus having a large-size substrate.

Thus, the invention described herein makes possible the advantage of providing a production method for a large display apparatus, including active devices having significantly higher performance than those of conventional amorphous or polycrystal active devices.

This and other advantages of the present invention will become apparent to those skilled in the art upon reading and understanding the following detailed description with reference to the accompanying figures.

DESCRIPTION OF THE PREFERRED EMBODIMENTS

A display apparatus according to the present invention is an active matrix display apparatus having a plurality of active devices provided on a substrate.

Conventionally, a process for producing a large-size active matrix array is begun by depositing an amorphous semi-insulative layer, which has been once plasma-disintegrated, on a substrate. Then, by using a photomask which is adapted to each individual array structure and arrangement, a semiconductor process is carried out which involves, e.g., resist pattern formation, etching, carrier injection, etc.

On the other hand, a small-size active matrix array (i.e., an active matrix array which is equal to or smaller than a single-crystal wafer size) can be obtained by directly processing a wafer. For example, by using a photomask which is adapted to each individual array structure and arrangement, a wafer is subjected to a semiconductor process involving resist pattern formation, etching, carrier injection, and the like. Thus, a small-size active matrix array which is equal to or smaller than a single-crystal wafer can be produced.

According to the present invention, a multitude of active devices are formed on a single-crystal wafer through usual LSI processes. Thereafter, the active devices on the wafer are processed into a thin-film configuration, isolated, and then placed on a lower substrate so as to correspond to a given array arrangement. Thus, according to the present invention, it is possible to form an active matrix structure on a large-size substrate (i.e., a substrate which is equal to or larger than the wafer size), where the active matrix structure is composed essentially of a single crystal of an impurity semiconductor material.

FIGS. 1A, 1B, 1C, 1D, 1E, 1F, 1G, 1H, and 1I are cross-sectional views showing an active matrix array substrate according to an example of the present invention, following a flow of steps for producing the active matrix array substrate.

Figure 1A:
FIGS. 1A, 1B, 1C, 1D, 1E, 1F, 1G, 1H, and 1I illustrate a flow of steps of one embodiment for producing a display apparatus according to the present invention.
Figure 1B:
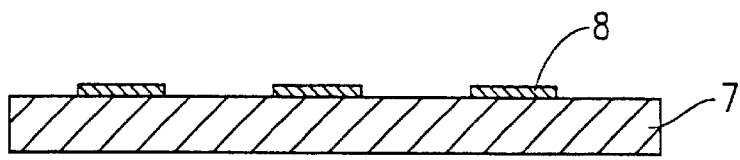

FIG. 1A shows a single-crystal substrate (wafer) 7 composed essentially of an Si or GaAs compound. On the wafer 7, switching devices 8 (e.g., transistors composed of an impurity semiconductor material, surface emitting lasers, or the like) are formed by processes, such as forming an insulation layer, pattern etching, carrier injection, etc. (FIG. 1B). The circuit patterns of the respective switching devices 8 are formed by using a photomask which is adapted to the desired active matrix structure.

Figure 1C:
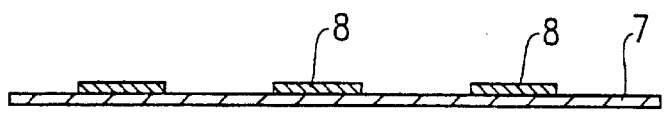
Figure 1D:
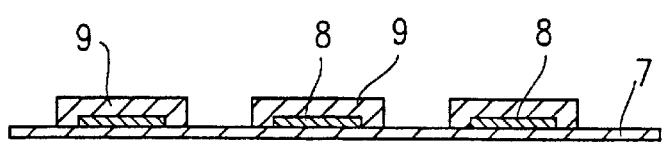
Figure 1E:
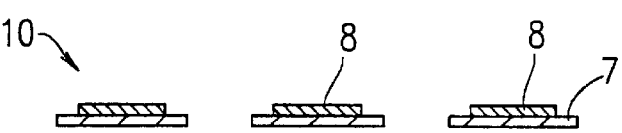

Next, the thickness of the wafer 7 is reduced from its lower face, via a lapping or polishing technique, so as to attain a predetermined thickness (FIG. 1C). As shown in FIGS. 1D to 1E, the switching devices 8 are isolated, i.e., divided into discrete chips having a predetermined size and shape. It should be noted that a blade dicing technique typically employed in LSI processes is not able to provide sufficient resolution (i.e., the resultant chips would not be small enough). Therefore, it is preferable to employ a photoresist 9 to protect the switching devices 8 as shown in FIG. 1D, and etch the wafer 7 after the thickness thereof has been reduced. The steps of FIGS. 1C, and 1D may be performed in the reverse order. Thus, as shown in FIG. 1E, a plurality of isolated chips 10 can be produced, each carrying an isolated switching device 8.

Figure 1F:
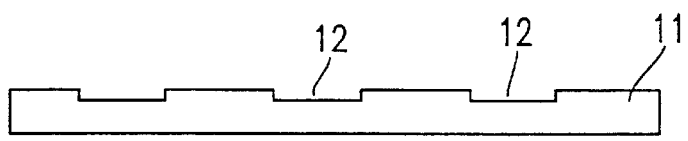

Next, holes 12 for receiving the switching devices 8 are formed in a second substrate 11, the pattern of the holes being adapted to an array arrangement of the active matrix substrate to be finally produced (FIG. 1F). The material for the substrate 11 may be glass, a metal, or a flexible material, such as a plastic, an acrylic resin and so on. The holes 12 may be formed by providing a photoresist pattern and performing etching; alternatively, a laser processing technique may be used.

Figure 1G:
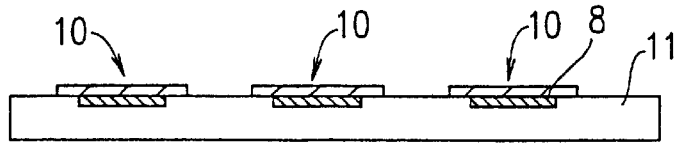

FIG. 1G shows how the switching devices 8 are placed in the holes 12. The size and depth of the holes 12 are predetermined so that the single-crystal substrate (wafer) 7 will always be above the switching device 8 (i.e., so that the substrate 7 faces away from the second substrate 11). Thus, merely shaking a number of switching devices 8 on the second substrate 11 for a certain period of time allows the isolated chips 10 to "fall" into each corresponding hole 12.

Figure 1H:
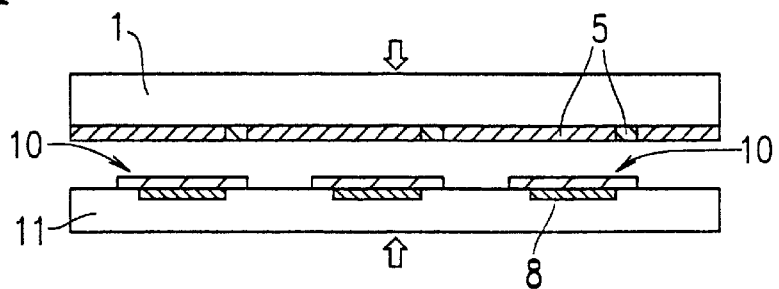
Figure 1I:
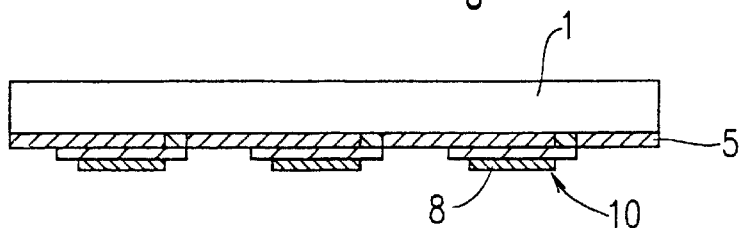
Figure 2:
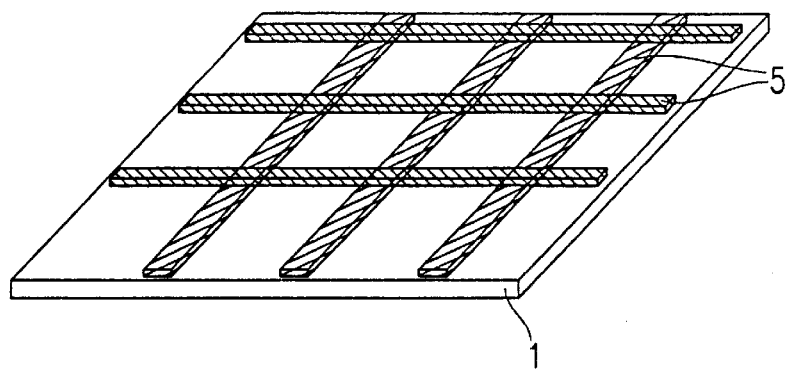
FIG. 2 is a perspective view showing wiring provided on an active matrix substrate.

In FIG. 1H, a substrate 1 is the substrate for composing a display device thereupon. The substrate 1 may be made of glass, a metal, or a flexible material, such as a plastic or a polymer. As shown in FIG. 2, a plurality of wires 5 are formed on the substrate 1 so as to intersect one another. The substrate 1 is opposed in alignment to the second substrate 11, on which the isolated chips 10 are attached, in such a manner as to realize a desired active matrix array arrangement (FIG. 1H). Then, the aligned substrate 1 and the second substrate 11 are pressed together (FIG. 1I). FIG. 1I shows the active matrix substrate 1 In which the wiring 5 and the switching devices 8 are interconnected.

Plasma-cleaning the surfaces of both substrates before applying pressure facilitates atomic bonding, which enhances the interconnection between the wires 5 and the switching devices 8.

Figure 3:
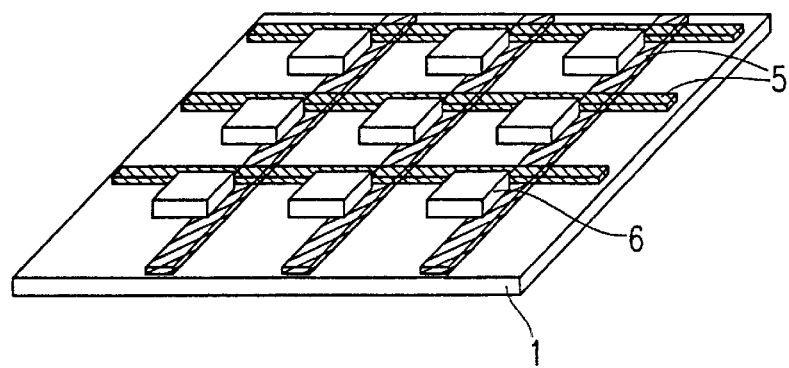
FIG. 3 is a perspective view showing a display apparatus according to one embodiment of the present invention.

The above-described manufacturing method allows a TFT active matrix array substrate of high-performance transistors of single-crystal Si (FIG. 3) to be produced, which has been impossible for a large-size substrate.

Figure 4:
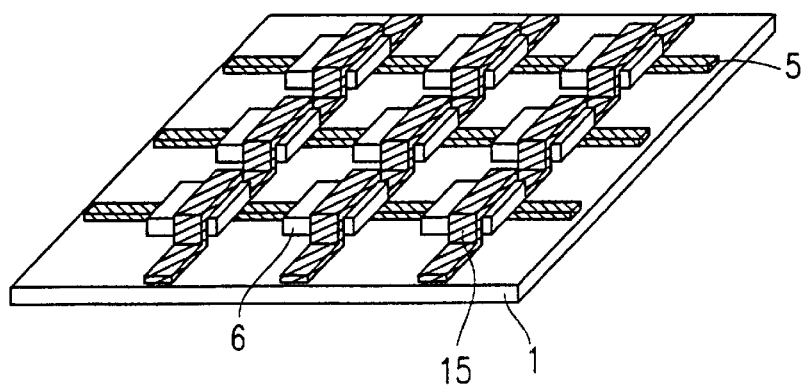
FIG. 4 shows a perspective view of a display apparatus of another embodiment of the present invention.

The above-described manufacturing method also allows surface emitting lasers to be produced using, for example, GaAs compound crystal materials. Thus, an auto-emission type active matrix display apparatus having a large-size substrate can be produced. FIG. 4 illustrates a wiring method for surface emitting lasers. The structure shown in FIG. 4 is the same as that shown in FIG. 3 in that lower electrodes 5 are previously provided on a substrate 1. However, upper electrodes 15 are produced at the end of the manufacturing process.

Hereinafter, the present invention will be described with reference to the following embodiments. It is noted that the present invention is not limited to such embodiments.

(Embodiment 1)

A MOS transistor was produced using a single-crystal Si wafer 7 (3 inches). A circuit was designed so that each transistor was sized 10 μm×10 μm. The transistors were deployed on the wafer surface so that a maximum number of transistors could be accommodated on the wafer surface. As a result, about 650,000 transistors were produced.

The thickness of the wafer 7 was reduced from its lower face, via a lapping and polishing technique, to attain a thickness of 5 μm. Then, as shown in FIG. 1D, a photoresist 9 was applied so as to cover each of the transistors 8. Thereafter, the thinned wafer 7 was partly etched with an aqueous solution of hydrofluric acid to isolate the transistors 8 from one another. After removing the photoresist 9, about 650,000 transistors were cut out from the wafer 7.

A negative-type photoresist pattern, which is adapted to the TFT arrangement of a TFT display having 700×900 pixels, is formed on a glass substrate 11 (300 mm×370 mm). Then, a timed etching was performed using an aqueous solution of hydrofluric acid, whereby a number of holes 12 adapted to the desired TFT arrangement were formed, as shown in FIG. 1F. It was ensured that each hole 12 was smaller than the Si substrate of each transistor 8 (i.e., the cut wafer 7 as shown in FIG. 1E). The transistors (as show in FIG. 1E) were placed on the glass substrate 11, and the substrate 11 was gently shaken. Such shaking allowed the transistors 8 to naturally fall into the holes 12 formed in the substrate 11, with the Si substrate 7 situated above the transistors 8, as was confirmed through microscopic observation.

Another glass substrate 1, having the same size as that of the above glass substrate 11 (i.e., 300 mm×370 mm), was prepared, on which only the wiring (e.g., Ta) for a TFT display of 700×900 pixels was provided.

The wiring side and transistor side of each of these two substrates 1 and 11 thus produced were plasma-cleaned. Immediately after the plasma-cleaning, both substrates were aligned, and then pressed together. Thereafter, the substrate 11 was removed from the substrate 1. Thus, the substrate 1 carrying the wiring 5 interconnected with the: transistors 8 thereon was obtained, as shown in FIG. 1I.

Transparent electrode (ITO) pixels (not shown) were formed so as to be in electrical contact with the transistors 8. Then, the substrate 1 was attached to a counter substrate (not shown), and a liquid crystal material was injected into the space between the substrate 1 and the counter substrate. Thus, a liquid crystal panel was produced. When this liquid crystal panel was driven by an active matrix method, no defects were observed, thus demonstrating that there is no problem in the operation of the active matrix display apparatus incorporating the single-crystal Si transistors produced according to the present invention.

(Embodiment 2)

As a second embodiment of the present invention, a display apparatus was produced as follows.

The display apparatus according to Embodiment 2 of the present invention was produced in the manner described in Embodiment 1. However, SiMOS transistors were combined with an organic EL luminant in Embodiment 2, while Embodiment 1 featured SiMOS transistors in combination with a liquid crystal material.

Firstly, wiring 5 was formed on one face of the substrate 1. Next, after placing the SiMOS transistors 6 on the substrate 1, transparent electrode ITO pixels (not shown) were formed, so as to be in contact with the transistors 6. Then, an organic EL layer (not shown) was formed. Finally, another set of wires 15 (FIG. 4), intersecting the wires 5 at right angles, was formed.

The operation of the active matrix display provided a display with no defects. This demonstrates that there is no problem in the operation of the active matrix organic EL display apparatus of the single-crystal Si transistors produced according to the present invention.

(Embodiment 3)

As a third embodiment of the present invention, a display apparatus was produced as follows.

The display apparatus according to Embodiment 3 of the present invention was produced in the manner as described in Embodiment 1. However, a surface emitting laser using a GaAs wafer was provided in Embodiment 3 while a MOS transistor using a single-crystal Si wafer was produced in Embodiment 1.

Firstly, as shown in FIG. 4, wiring 5 was formed on one face of a substrate 1. Next, after placing the surface emitting lasers 6 on the substrate 1, another wiring 15 intersecting the lasers 6 at right angles was formed.

Thereafter, the operation of the active matrix display provided a display with no defects. This demonstrates that there was no problem in the operation of the active matrix display apparatus of the surface emitting lasers produced according to the present invention.

Specific embodiments of the present invention have been described heretofore; however, it is noted that the present invention is not limited to such embodiments.

The present invention makes it possible to produce a large-size display apparatus which includes active devices having considerably higher performance than those of conventional amorphous or polycrystal active devices (e.g., single-crystal Si transistors or compound semiconductor light-emitting lasers).

Various other modifications will be apparent to and can be readily made by those skilled in the art without departing from the scope and spirit of this invention. Accordingly, it is not intended that the scope of the claims appended hereto be limited to, the description as set forth herein, but rather that the claims be broadly construed.

What is claimed is:

1. A method for manufacturing a display apparatus, comprising the steps of:

producing a plurality of active devices on a first substrate comprising a semi-insulative crystal;

reducing a thickness of the crystal from a lower face thereof to attain a predetermined thickness;

isolating the plurality of active devices from one another;

forming a plurality of holes in a second substrate adapted to a matrix arrangement in which the plurality of active devices are to be deployed on a display apparatus;

placing the plurality of active devices into the plurality of holes; and after the plurality of active devices are placed into the plurality of holes, pressing the second substrate against a third substrate on which a plurality of wires are formed, thereby transferring the plurality of active devices onto the third substrate and connecting each of the plurality of wires to a corresponding one of the plurality of active devices.

2. A method according to claim 1, wherein the plurality of active devices are MOS transistors formed from single-crystal Si.

3. A method according to claim 1, wherein the plurality of active devices are surface emitting lasers formed from crystals of a GaAs compound.

* * * * *